No. 747,985. PATENTED DEC. 29, 1903.
W. LAY.
LOCK MEANS FOR NUTS AND BOLTS.
APPLICATION FILED SEPT. 18, 1903.
NO MODEL.
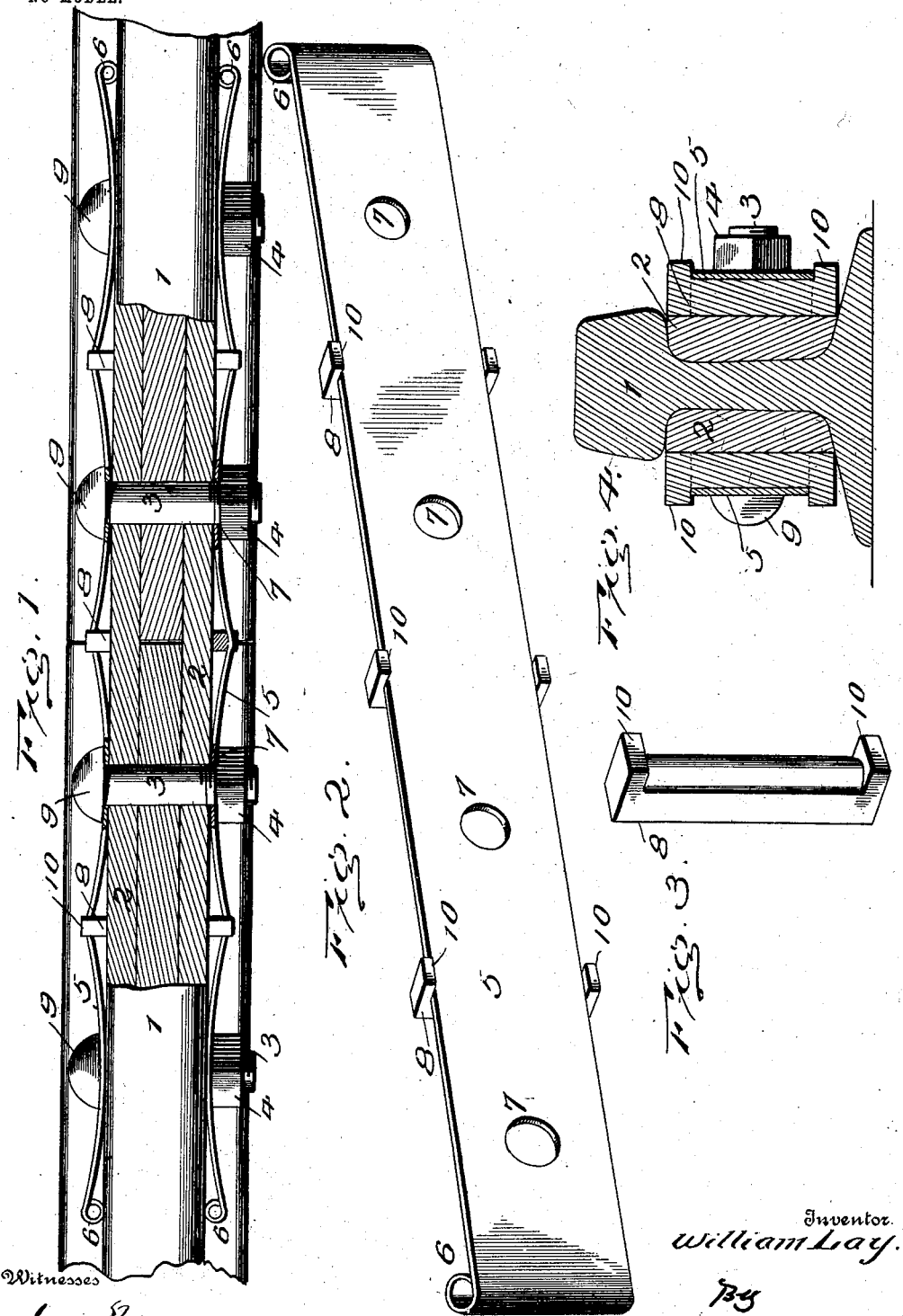
Witnesses
Inventor
William Lay.
By
Lacey, Attorneys.

No. 747,985.  
Patented December 29, 1903.

UNITED STATES PATENT OFFICE.

WILLIAM LAY, OF ENID, OKLAHOMA TERRITORY.

LOCK MEANS FOR NUTS AND BOLTS.

SPECIFICATION forming part of Letters Patent No. 747,985, dated December 29, 1903.

Application filed September 18, 1903. Serial No. 173,719. (No model.)

*To all whom it may concern:*

Be it known that I, WILLIAM LAY, a citizen of the United States, residing at Enid, in the county of Garfield and Territory of Oklahoma, have invented certain new and useful Improvements in Lock Means for Nuts and Bolts, of which the following is a specification.

This invention provides improvements in that class of lock means usually utilized for preventing accidental displacement of nuts from bolts of the type embodying the use of a spring member for coöperation with the nut to frictionally hold the same from unscrewing because of vibration or jar due to causes which are obvious. The lock means comprising my invention is adapted for application to machinery, rail-joints, bridgework, and the like.

For a full description of the invention and the merits thereof and also to acquire a knowledge of the details of construction of the means for effecting the result reference is to be had to the following description and drawings hereto attached.

While the essential and characteristic features of the invention are susceptible of modification, still the preferred embodiment of the invention is illustrated in the accompanying drawings, in which—

Figure 1 is a plan view showing my invention as applied to a joint for the meeting ends of rails. Fig. 2 is a perspective view of the spring-plate, which is adapted to frictionally lock either the bolt or nut separately, or it may be used to lock both at the same time. Fig. 3 is a detail perspective view of the rigid spacing member. Fig. 4 is a transverse sectional view through a rail-joint having the invention applied thereto.

Corresponding and like parts are referred to in the following description and indicated in all the views of the drawings by the same reference characters.

As before premised, it is designed that my lock means be used, if desired, to prevent turning of the bolt as well as to prevent unscrewing of the nut from the bolt. The invention is illustrated, as above indicated, showing the lock means used for coöperation with both the bolt and nut. In the drawings the rail ends are designated 1 and are of common structure. Fish-plates 2 are disposed adjacent the meeting ends of the rails in the usual manner. The rail and fish-plates are provided with openings to receive the bolts 3, and nuts 4 are adapted to be screwed upon the threaded ends of the bolts in a manner readily seen. The lock means used consists, essentially, of a spring-plate 5, which is provided with projections 6 upon the corresponding end portions thereof, by which the said plate is spaced from the adjacent part to which it may be attached, and in this instance said part consists of the fish-plate 2. The projections 6 aforesaid are formed by rolling the ends of the spring plate or plates should more than one of these elements be used, as shown in Fig. 1 of the drawings. The structure of the projections 6 is advantageous in that they serve to additionally provide spring means for spacing the plates 5 from the adjacent parts. When the spring-plates 5 are used in connection with two or more bolts, the same are provided with a plurality of openings 7, which receive the bolts after they have been passed through the parts which are to be secured together. Further, when the spring-plates are adapted for coöperation with two or more bolts or nuts rigid spacing members 8 are provided, which are to be disposed intermediate the several bolts or nuts, as the case may be, to effect an independent spring action of those portions of the spring-plates which are disposed in frictional contact with the heads 9 of the bolts 3 or with the under side of the nuts 4. The spacing members 8 consist of solid bodies having end lugs 10 projected therefrom to receive intermediate thereof the spring-plates. The spacing members are thus held from displacement by the lugs 10 aforesaid in a manner which will be readily seen. The bearing-surface of the body of the members 8 is of convex form in cross-section, so as to facilitate the bending of the spring-plates under the action of the nuts or heads of the bolts which bear thereagainst.

It will be understood that the spring-plates 5 may be used for locking the bolts alone or for locking the nuts should it be necessary to apply the same, as shown in Fig. 1 of the drawings. It will also be apparent that the spring-plates may be used in connection with a single nut or bolt, in which instance they would be provided with a single bolt-receiving opening 7 and the use of the rigid spacing members would be dispensed with. The under sides of the nuts may be made concave, and it is desirable that the heads of the bolts be of like formation. The lock means may be used in connection with the forms of nuts and bolts at present commonly in use, since it is not essential that the structure of either the nuts or bolts be modified in any particular to adapt the same for use in connection with my lock means, this being an essential advantage. The double-spring effect secured by the provision of the spring projections 6 and the spring action of the plate-bodies themselves is also of considerable advantage.

Having thus described the invention, what is claimed as new is—

1. In lock means for nuts and bolts, the combination with a spring-plate for preventing turning of either of the aforesaid elements, spring projections extended from the said plate to space the same from the part adjacent which it may be disposed and rigid spacing means adjacent said spring projections.

2. In lock means for nuts and bolts, the combination with a spring-plate for preventing turning of either aforesaid elements, spring projections extended from the said plate to space the same from the part adjacent to which it may be disposed and intermediate rigid spacing members adjacent to and coöperating with the spring projections aforesaid.

3. In lock means for nuts and bolts, the combination with a spring-plate, the same being provided with openings to receive bolts, the end portions of the plate being provided with spring projections integrally formed therewith, and independent rigid spacing members provided with convex bearing-surface disposed intermediate the spring projections of the plate and coöperating with said projections, and lugs projected from the spacing members and preventing displacement of the said members from coöperating relation with the spring-plate.

4. In lock means, the combination with a plurality of bolts, nuts, a spring-plate provided with a plurality of openings to receive the bolts aforesaid, removable spacing members disposed upon either side of the nuts of the bolts between the said spring-plate and the part adjacent which the same is disposed.

5. In lock means, the combination with a plurality of bolts, nuts, a spring-plate provided with a plurality of openings to receive the bolts aforesaid and having its end portions rolled to form spacing projections, rigid spacing members disposed intermediate the nuts aforesaid to cause independent spring action of the portions of the plates in contact with the said nuts, and means for preventing displacement of the rigid spacing members.

In testimony whereof I affix my signature in presence of two witnesses.

WILLIAM LAY. [L. S.]

Witnesses:
 JOHN C. MOORE,
 J. E. MCCARTY.